US009781014B2

(12) United States Patent
Balasubramanian

(10) Patent No.: US 9,781,014 B2
(45) Date of Patent: Oct. 3, 2017

(54) CALL ESTABLISHMENT AND MAINTENANCE IN A WIRELESS NETWORK

(75) Inventor: Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/788,506

(22) Filed: May 27, 2010

(65) Prior Publication Data

US 2010/0329207 A1 Dec. 30, 2010

Related U.S. Application Data

(62) Division of application No. 11/777,210, filed on Jul. 12, 2007.

(Continued)

(51) Int. Cl.
*H04L 12/24* (2006.01)
*H04L 12/26* (2006.01)
(Continued)

(52) U.S. Cl.
CPC ...... *H04L 41/5054* (2013.01); *H04L 41/0806* (2013.01); *H04L 43/0847* (2013.01);
(Continued)

(58) Field of Classification Search
CPC ..... H04W 28/18; H04W 28/20; H04W 48/18; H04W 4/22; H04W 76/007; H04W 76/02;
(Continued)

(56) References Cited

U.S. PATENT DOCUMENTS 6,003,061 A 12/1999 Jones et al.
6,201,971 B1 * 3/2001 Purnadi et al. ............... 455/450
(Continued)

FOREIGN PATENT DOCUMENTS

CN 1240081 A 12/1999
CN 1282174 A 1/2001
(Continued)

OTHER PUBLICATIONS

Crawley. E. et al., "A Framework for Integrated Services and RSVP over ATM; draft-IETF-issllatm-framework-04txt, XP015021691 ; ISSN:0000-0004", IETF Standard—Working-Draft, Internet Engineering Task Force, IETF, CH, 1998, 4, 1-30.
(Continued)

*Primary Examiner* — Dinh P Nguyen
(74) *Attorney, Agent, or Firm* — Qualcomm Incorporated

(57) ABSTRACT

Techniques to configure quality of service (QoS) and utilize radio resources for a call in a WLAN are described. In an aspect, a station ensures that an access point in the WLAN is suitable for receiving service prior to performing registration to receive services via the WLAN. In another aspect, the station first requests for radio resources for traffic flows, then requests for radio resources for signaling flows, and sends signaling as best effort traffic if radio resources are not granted for the signaling flows. In yet another aspect, the station aggregates QoS for multiple applications and requests for radio resources based on the aggregated QoS. In yet another aspect, the station releases extra radio resources corresponding to the difference between the QoS granted by the WLAN and the QoS proposed by a remote terminal for the call. In yet another aspect, the station requests for the same QoS or lower from a new access point during handoff.

12 Claims, 9 Drawing Sheets

Related U.S. Application Data

(60) Provisional application No. 60/831,004, filed on Jul. 14, 2006.

(51) Int. Cl.
*H04W 48/18* (2009.01)
*H04W 76/00* (2009.01)
*H04W 4/22* (2009.01)
*H04W 76/02* (2009.01)

(52) U.S. Cl.
CPC ............ *H04L 43/16* (2013.01); *H04W 48/18* (2013.01); *H04W 76/007* (2013.01); *H04L 43/087* (2013.01); *H04L 43/0852* (2013.01); *H04W 4/22* (2013.01); *H04W 76/02* (2013.01)

(58) Field of Classification Search
CPC ............ H04W 28/24; H04W 72/1231; H04W 72/1236; H04L 47/10; H04L 47/805; H04L 47/24; H04L 41/0806; H04L 41/5054; H04L 67/32; H04L 43/16; H04L 43/0847; H04L 43/087
USPC ...... 455/436, 437, 432.1, 432.3, 434, 435.2, 455/438, 439, 442, 452.2
See application file for complete search history.

(56) References Cited

U.S. PATENT DOCUMENTS

| | | | |
|---|---|---|---|
| 6,442,152 | B1 | 8/2002 | Park et al. |
| 6,522,881 | B1 | 2/2003 | Feder et al. |
| 6,731,669 | B1 | 5/2004 | Kudoh et al. |
| 7,453,844 | B1 | 11/2008 | Lee et al. |
| 2002/0032800 | A1 | 3/2002 | Puuskari et al. |
| 2002/0114279 | A1 | 8/2002 | Eriksson |
| 2002/0120749 | A1 | 8/2002 | Widegren et al. |
| 2002/0191622 | A1 | 12/2002 | Zdan |
| 2003/0037146 | A1 | 2/2003 | O'neill |
| 2003/0125028 | A1* | 7/2003 | Reynolds ................. 455/437 |
| 2003/0156578 | A1 | 8/2003 | Bergenlid et al. |
| 2003/0174667 | A1 | 9/2003 | Krishnamurthi et al. |
| 2003/0210665 | A1 | 11/2003 | Salmenkaita et al. |
| 2003/0235171 | A1 | 12/2003 | Lundstrom et al. |
| 2004/0047437 | A1 | 3/2004 | Hamiti et al. |
| 2004/0062262 | A1 | 4/2004 | Venteicher et al. |
| 2004/0109414 | A1 | 6/2004 | Choi et al. |
| 2004/0137908 | A1* | 7/2004 | Sinivaara et al. ......... 455/452.1 |
| 2004/0142704 | A1 | 7/2004 | Scholz |
| 2004/0165563 | A1 | 8/2004 | Hsu et al. |
| 2004/0196850 | A1 | 10/2004 | Ho |
| 2004/0198365 | A1* | 10/2004 | Verma ............... H04W 36/0011 455/452.1 |
| 2004/0203658 | A1* | 10/2004 | Narayanan ................. 455/414.1 |
| 2004/0252676 | A1 | 12/2004 | Bye |
| 2005/0007984 | A1 | 1/2005 | Shaheen et al. |
| 2005/0025180 | A1 | 2/2005 | Curcio et al. |
| 2005/0059400 | A1 | 3/2005 | Jagadeesan et al. |
| 2005/0073954 | A1 | 4/2005 | Bodin et al. |
| 2005/0083899 | A1 | 4/2005 | Babbar et al. |
| 2005/0085257 | A1 | 4/2005 | Laird et al. |
| 2005/0136928 | A1* | 6/2005 | Zaki ................. 455/436 |
| 2005/0138451 | A1 | 6/2005 | Simpson et al. |
| 2005/0159166 | A1 | 7/2005 | Jonsson et al. |
| 2005/0185583 | A1 | 8/2005 | Hosein |
| 2005/0271011 | A1 | 12/2005 | Alemany et al. |
| 2006/0007914 | A1 | 1/2006 | Chandra et al. |
| 2006/0023663 | A1 | 2/2006 | Kim et al. |
| 2006/0030290 | A1 | 2/2006 | Rudolf et al. |
| 2006/0083193 | A1* | 4/2006 | Womack et al. ............ 370/328 |
| 2006/0114855 | A1 | 6/2006 | Zheng |
| 2006/0116127 | A1 | 6/2006 | Wilhoite et al. |
| 2006/0121916 | A1 | 6/2006 | Aborn et al. |
| 2006/0126581 | A1 | 6/2006 | Katsumata et al. |
| 2006/0133318 | A1* | 6/2006 | Jung et al. ................. 370/331 |
| 2006/0146868 | A1 | 7/2006 | Ginzburg |
| 2006/0252407 | A1 | 11/2006 | O.Goldman et al. |
| 2006/0268678 | A1 | 11/2006 | Dhesikan et al. |
| 2007/0026810 | A1 | 2/2007 | Love et al. |
| 2007/0058561 | A1* | 3/2007 | Virgile ...................... 370/252 |
| 2007/0060158 | A1 | 3/2007 | Medepalli et al. |
| 2007/0076679 | A1 | 4/2007 | Lee |
| 2007/0165610 | A1 | 7/2007 | Tseng et al. |
| 2008/0014956 | A1 | 1/2008 | Balasubramanian |
| 2008/0192632 | A1 | 8/2008 | Bader |
| 2008/0298313 | A1 | 12/2008 | Salminen |
| 2010/0329224 | A1 | 12/2010 | Balasubramanian |
| 2010/0329225 | A1 | 12/2010 | Balasubramanian |

FOREIGN PATENT DOCUMENTS

| | | |
|---|---|---|
| CN | 1423435 A | 6/2003 |
| CN | 1714594 A | 12/2005 |
| CN | 1735092 A | 2/2006 |
| EP | 0946008 A2 | 9/1999 |
| EP | 1523129 A2 | 4/2005 |
| GB | 2386282 | 9/2003 |
| JP | 2000209298 A | 7/2000 |
| JP | 2000269935 A | 9/2000 |
| JP | 2001298467 | 10/2001 |
| JP | 2004514339 A | 5/2004 |
| JP | 2004247950 A | 9/2004 |
| JP | 2004254278 A | 9/2004 |
| JP | 2004274741 A | 9/2004 |
| JP | 2004297205 A | 10/2004 |
| JP | 2004349932 | 12/2004 |
| JP | 2005012725 A | 1/2005 |
| JP | 2005012973 A | 1/2005 |
| JP | 2005142811 A | 6/2005 |
| JP | 2005236388 A | 9/2005 |
| JP | 2006500808 A | 1/2006 |
| JP | 2006500841 A | 1/2006 |
| JP | 2006509445 A | 3/2006 |
| JP | 2006512021 A | 4/2006 |
| JP | 2006148823 A | 6/2006 |
| JP | 2007508781 A | 4/2007 |
| JP | 2007520917 A | 7/2007 |
| JP | 2008505540 A | 2/2008 |
| KR | 20000025492 A | 5/2000 |
| KR | 20030087567 | 11/2003 |
| KR | 20040050603 A | 6/2004 |
| KR | 20050060085 A | 6/2005 |
| KR | 20050116794 A | 12/2005 |
| KR | 20060032313 A | 4/2006 |
| TW | M288740 | 3/2006 |
| WO | WO9610320 | 4/1996 |
| WO | WO-9827692 A1 | 6/1998 |
| WO | 0239759 A2 | 5/2002 |
| WO | WO03067832 A1 | 8/2003 |
| WO | WO-2004054291 A1 | 6/2004 |
| WO | WO2004064439 | 7/2004 |
| WO | WO-2004084004 A2 | 9/2004 |
| WO | WO-2005039209 A1 | 4/2005 |
| WO | 2005048081 A2 | 5/2005 |
| WO | WO2005041611 | 5/2005 |
| WO | WO-2005048533 A1 | 5/2005 |
| WO | WO2005057866 | 6/2005 |
| WO | WO2005112488 | 11/2005 |
| WO | WO-2005120096 A2 | 12/2005 |
| WO | 2006012191 A1 | 2/2006 |
| WO | WO2006020168 | 2/2006 |
| WO | 2006054729 A1 | 5/2006 |
| WO | WO2007106604 | 9/2007 |

OTHER PUBLICATIONS

Ericsson AB: "Aggregating RSVP Flows and Reserving Shared Bearers in UMTS", Research Disclosure,Mason Publications, Hampshire, GB, vol. 462, No. 66, pp. 48,Oct. 1, 2002, XP007131363,ISSN: 03744353.
Internationsl Search Report—PCT/US07/073523—International Search Authority—European Patent Office, Jun. 2, 2008.

(56) References Cited

OTHER PUBLICATIONS

Translation of Office Action in Korean application 10-2011-7001797 corresponding to U.S. Appl. No. 11/777,210, citing KR20030087567 and KR20040050603 dated Mar. 15, 2011.
Translation of Office Action in Korean application 10-2011-7001799 corresponding to U.S. Appl. No. 11/777,210, citing KR20050116794, KR20000025492 and KR20050060085 dated Mar. 15, 2011.
Written Opinion—PCT/US07/073523—International Search Authority—European Patent Office, Aug. 2, 2008.
European Search Report—EP11168591—Search Authority—Munich—Jul. 22, 2011.
European Search Report—EP11168593—Search Authority—Munich—Sep. 26, 2011.
Taiwan Search Report—TW096125924—TIPO—Jul. 15, 2011.
IEEE Std 802.11e-2005, Sec 9.9.3 and 11.4, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications: Amendment 8: Medium Access Control (MAC) Quality of Service Enhancements", IEEE, Nov. 11, 2005.

* cited by examiner

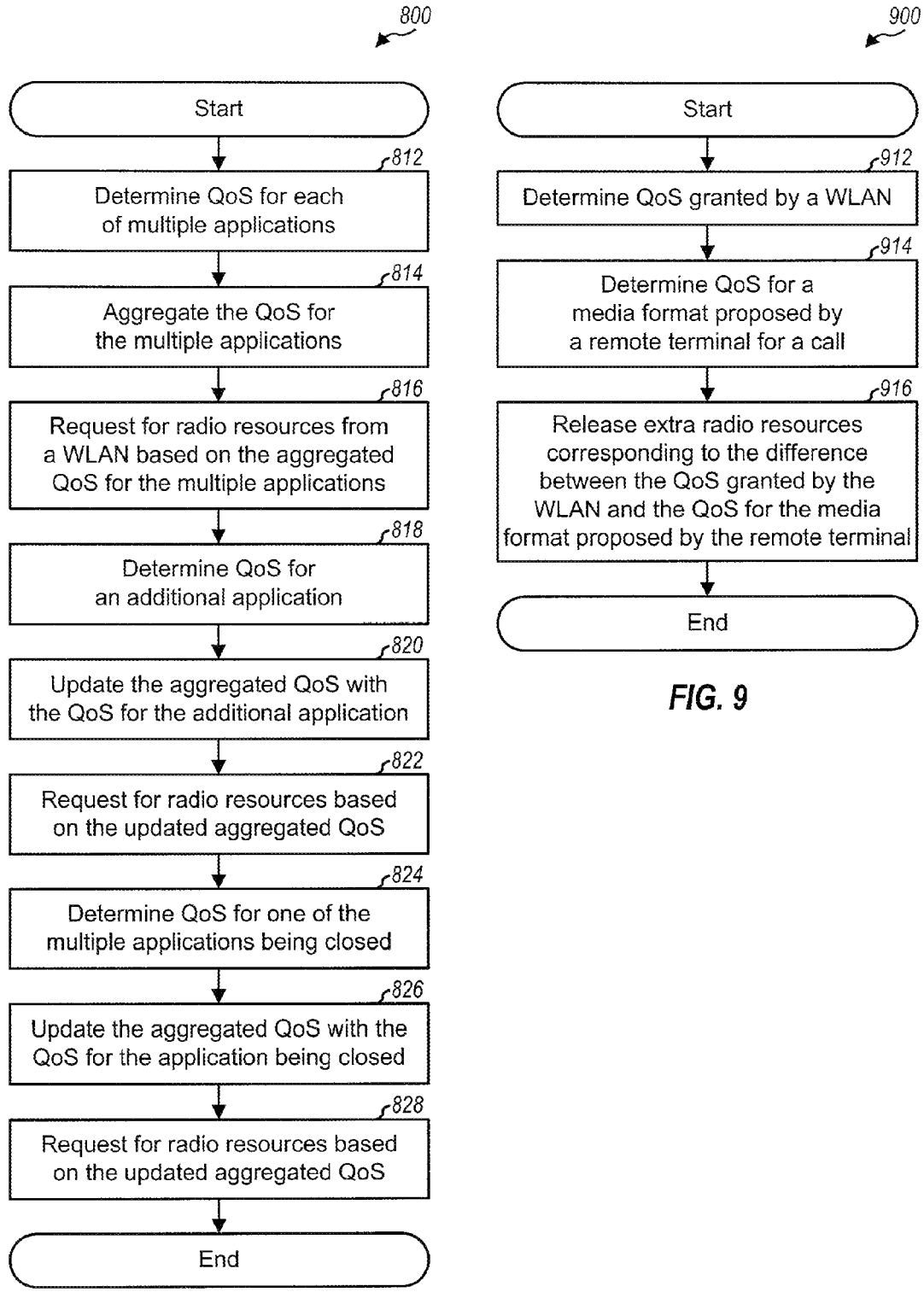

CALL ESTABLISHMENT AND MAINTENANCE IN A WIRELESS NETWORK

The present application for Patent is a Divisional and claims priority to patent application Ser. No. 11/777,210, filed Jul. 12, 2007, entitled "CALL ESTABLISHMENT AND MAINTENANCE IN A WIRELESS NETWORK," and claims priority to Provisional U.S. Application No. 60/831,004, filed Jul. 14, 2006, entitled "VOICE OVER IP FOR WIRELESS LOCAL AREA NETWORK," and assigned to the assignee hereof and hereby expressly incorporated by reference herein.

BACKGROUND

I. Field

The present disclosure relates generally to communication, and more specifically to techniques for establishing and maintaining a call in a wireless network.

II. Background

Wireless communication networks are widely deployed to provide various communication services such as voice, video, packet data, messaging, broadcast, etc. These wireless networks include wireless wide area networks (WWANs), wireless metropolitan area networks (WMANs), and wireless local area networks (WLANs). The terms "network" and "system" are often used interchangeably.

A user may utilize a station (e.g., a cellular phone) to obtain a desired service (e.g., voice) from a wireless network. The desired service may be satisfactorily provided to the user by ensuring that the required quality of service (QoS) can be achieved for the service. The required QoS may be quantified by different parameters for different services and/or different wireless networks. For example, voice service may require a relatively stringent delay, a certain minimum guaranteed data rate, and a certain frame error rate (FER) or packet error rate (PER) for satisfactory performance.

The station may exchange signaling with the wireless network in order to configure QoS for the desired service. The wireless network may grant sufficient radio resources to meet the QoS for the desired service. It is desirable to efficiently configure QoS and utilize radio resources for a call for the desired service.

SUMMARY

Techniques to efficiently configure QoS and utilize radio resources for a call in a wireless network are described herein. In an aspect, a station ensures that an access point in a WLAN is suitable for receiving service prior to performing registration to receive services via the WLAN or to move services over to the WLAN. The station may detect for access points in the WLAN and may determine whether any detected access point is suitable for receiving service, e.g., based on FER of beacon frames received from an access point and/or received signal strength indicator (RSSI) measurements for the access point. The station may perform service registration after determining a suitable access point for receiving service.

In another aspect, the station may first request for radio resources for at least one traffic flow and may receive a first grant of radio resources for the traffic flow(s). The station may then request for radio resources for at least one signaling flow. The station may communicate via the traffic and signaling flows regardless of whether or not radio resources are granted for the signaling flow(s). The station may send data for the traffic flow(s) with the first grant of radio resources. The station may send signaling for the signaling flow(s) with radio resources granted for the signaling flow(s), if any, or as best effort traffic if no radio resources are granted.

In yet another aspect, the station may determine QoS for each of multiple applications and may aggregate the QoS for these applications. The station may then request for radio resources from the WLAN based on the aggregated QoS for these applications. The station may update the aggregated QoS whenever a new application is added or an existing application is removed. The station may then request for radio resources for the updated aggregated QoS.

In yet another aspect, the station may determine the QoS granted by the WLAN and the QoS for a media format proposed by a remote terminal for the call. The station may release extra radio resources corresponding to the difference between the QoS granted by the WLAN and the QoS for the media format proposed by the remote terminal.

In yet another aspect, the station may communicate with the remote terminal based on a first QoS granted by a first access point. The station may perform handoff from the first access point to a second access point. The station may request for the first QoS or lower from the second access point and may receive a grant of the first QoS or lower from the second access point. The station may then communicate with the remote terminal based on the first QoS or lower granted by the second access point. This avoids causing the remote terminal to re-negotiate QoS.

Various aspects and features of the disclosure are described in further detail below.

BRIEF DESCRIPTION OF THE DRAWINGS

FIG. 8 shows a process for aggregating QoS for multiple applications.

FIG. 9 shows a process for relinquishing extra radio resources.

DETAILED DESCRIPTION

The techniques described herein may be used for various wireless networks such as WWANs, WMANs, and WLANs. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as cdma2000, Universal Terrestrial Radio Access (UTRA), etc. cdma2000 covers IS-2000, IS-95 and IS-856 standards.

UTRA includes Wideband CDMA (W-CDMA) and Low Chip Rate (LCR). A TDMA network may implement a radio technology such as Global System for Mobile Communications (GSM). An OFDMA network may implement a radio technology such as Evolved UTRA (E-UTRA), IEEE 802.20, Flash-OFDM®, etc. A WMAN may implement a radio technology such as IEEE 802.16. A WLAN may implement a radio technology such as IEEE 802.11, Hiperlan, etc. These various radio technologies and standards are known in the art. UTRA, E-UTRA and GSM are described in documents from an organization named "3rd Generation Partnership Project" (3GPP). cdma2000 is described in documents from an organization named "3rd Generation Partnership Project 2" (3GPP2). For clarity, certain aspects of the techniques are described below for a WLAN that implements IEEE 802.11.

Figure 1:
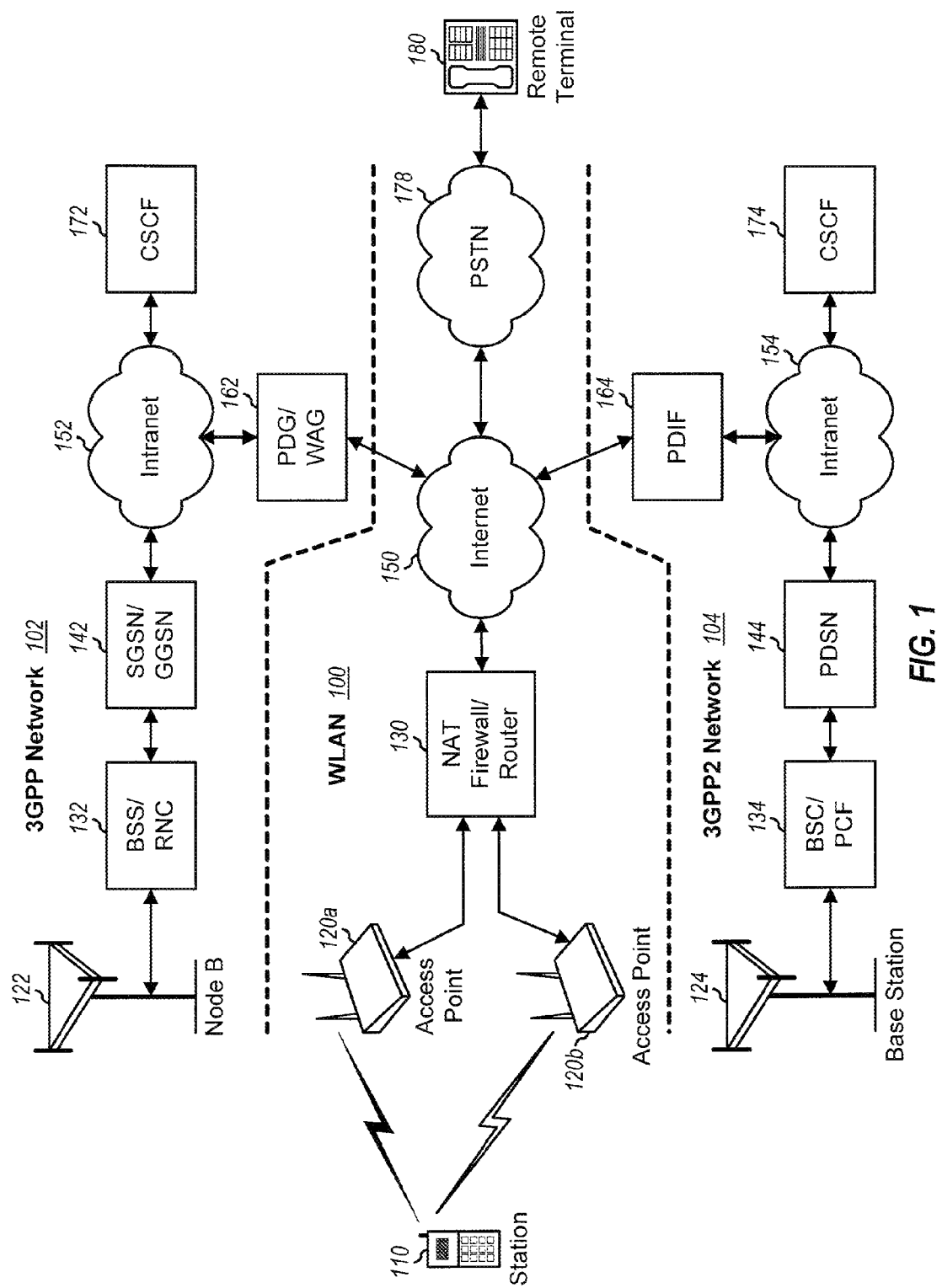
FIG. 1 shows a WLAN, a 3GPP network, and a 3GPP2 network.

FIG. 1 shows a deployment of a WLAN 100, a 3GPP network 102, and a 3GPP2 network 104. A station (STA) 110 may communicate with WLAN 100 to obtain various communication services supported by WLAN 100, 3GPP network 102, and/or 3GPP2 network 104. Station 110 may also be referred to as a mobile station, a user equipment (UE), a terminal, a user terminal, a subscriber unit, etc. Station 110 may be a cellular phone, a personal digital assistant (PDA), a wireless modem, a handheld device, a laptop computer, etc. Station 110 may communicate or exchange data with other terminals and/or servers (e.g., a remote terminal 180) via WLAN 100.

WLAN 100 includes access points 120a and 120b and a Network Address Translation (NAT) firewall/router 130. Each access point 120 provides access to distribution services via the wireless medium/channel for stations associated with that access point. Router 130 routes packets between access points 120 and the Internet 150 and may perform translation between private and public Internet Protocol (IP) addresses for the access points and stations within WLAN 100. WLAN 100 may implement any standard in the IEEE 802.11 family of standards. WLAN 100 may also implement IEEE 802.11e, which covers QoS enhancements for a Medium Access Control (MAC) layer.

3GPP network 102 may be a Universal Mobile Telecommunication System (UMTS) network that utilizes W-CDMA or a GSM network. In 3GPP network 102, a Node B 122 supports radio communication for UEs (not shown). A Base Station Subsystem (BSS)/Radio Network Controller (RNC) 132 controls the use of radio resources and performs other functions. A Serving GPRS Support Node (SGSN) 142 supports transfer of packets to and from the UEs served by the SGSN and may perform functions such as packet routing, access control, mobility management, security, etc. A Gateway GPRS Support Node (GGSN) 142 interfaces with an intranet 152 and may perform functions such as packet routing, IP address assignment, authentication, billing, etc. A Packet Data Gateway (PDG)/WLAN Access Gateway (WAG) 162 allows UEs to access services from 3GPP network 102 via WLANs and may perform various functions such as user authentication, secure tunnel management, etc. A Call Session Control Function (CSCF) 172 may include a Proxy CSCF (P-CSCF), a Serving CSCF (S-CSCF), an Interrogating CSCF (I-CSCF), etc. CSCF 172 performs various functions to support IP Multimedia Subsystem (IMS) services such as Voice-over-IP (VoIP), multimedia, Short Message Service (SMS) over IP, Instant Messaging (IM), push-to-talk (PTT), etc. CSCF 172 may process requests from UEs for IMS services, perform registration for IMS, provide session control services, maintain session state information, etc.

3GPP2 network 104 may be a CDMA2000 1× network that utilizes IS-2000 or IS-95, a High Rate Packet Data (HRPD) network that utilizes IS-856, etc. In 3GPP2 network 104, a base station 124 supports radio communication for mobile stations (not shown). A Base Station Controller (BSC)/Packet Control Function (PCF) 134 provides coordination and control for the base stations under its control and routes data for these base stations. A Packet Data Serving Node (PDSN) 144 supports data services for the mobile stations in 3GPP2 network 104 and may perform functions such as data session establishment, maintenance, and termination, packet routing, IP address assignment, etc. A Packet Data Interworking Function (PDIF) 164 provides IP connectivity to 3GPP2 network 104 and may perform various functions such as user authentication, secure tunnel management, IP address allocation, packet encapsulation and de-capsulation, etc. CSCF 174 performs various functions to support IMS services.

Wireless networks 100, 102 and 104 may include other network entities not shown in FIG. 1. Wireless networks 100, 102 and 104 may couple directly or indirectly to other networks such as a Public Switched Telephone Network (PSTN) 178 that serves conventional telephones. Station 110 may communicate with other terminals and servers that may communicate with any of the networks.

Figure 2:
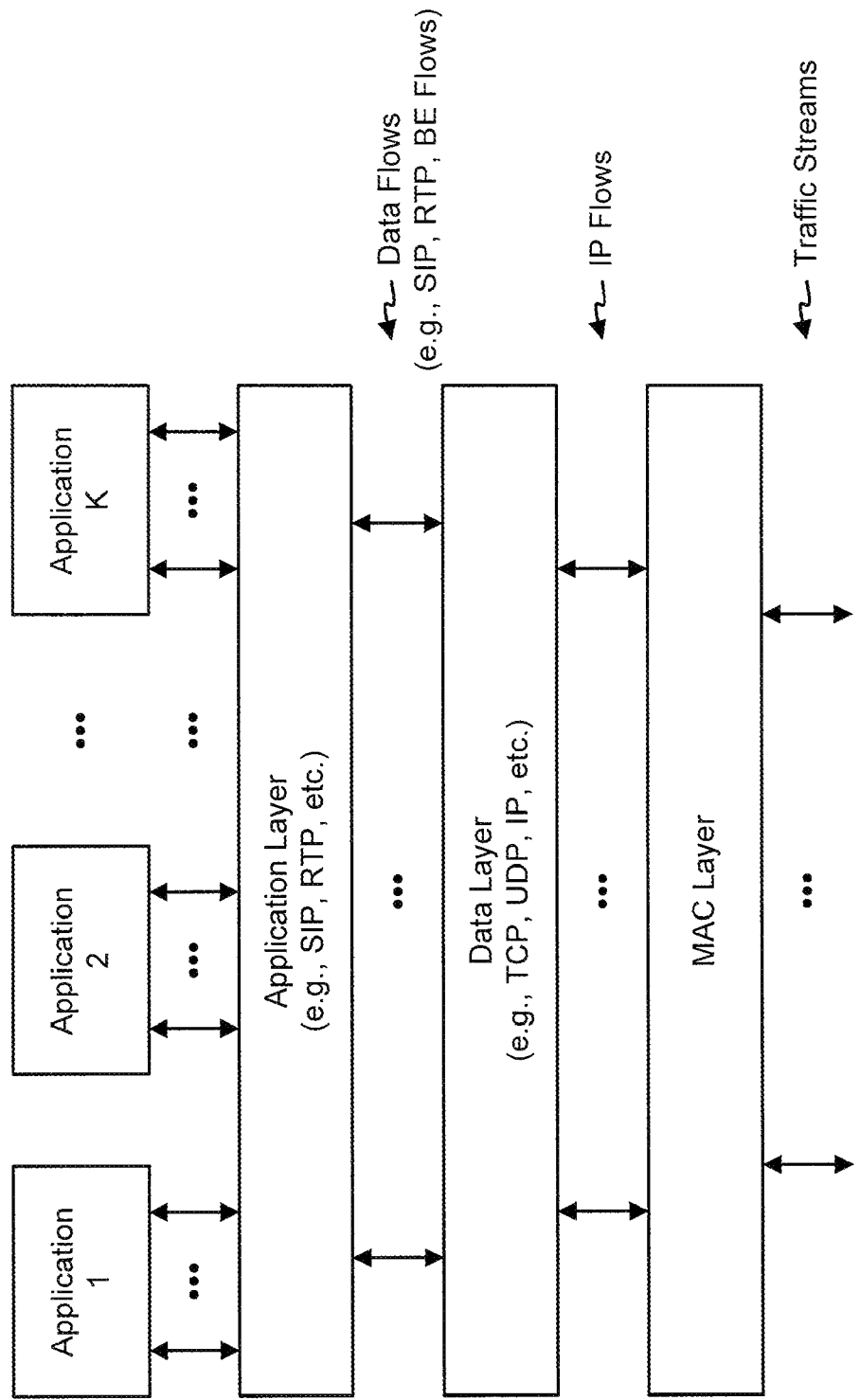
FIG. 2 shows data flows and streams at various layers.

FIG. 2 shows flows and streams at various layers for station 110 when communicating with WLAN 100. Station 110 may have one or more applications that may engage any communication services. The applications may be for VoIP, video, packet data, etc. The applications may communicate with other entities (e.g., remote terminal 180) using Session Initiation Protocol (SIP), Real-time Transport Protocol (RTP), and/or other protocols at an application layer. SIP is a signaling protocol for creating, modifying, and terminating sessions for VoIP, multimedia, etc. RTP provides end-to-end network transport functions and is suitable for applications sending real-time data such as voice, video, etc. Each application may have any number of data flows. A data flow may be a SIP flow, an RTP flow, a best effort (BE) flow, etc. For example, a VoIP application may have one or more RTP flows for traffic data and a SIP flow for signaling. As another example, application 1 may be a SIP application having a SIP flow. Applications 2 through N may be SIP-based applications, each of which may have one or more data flows for traffic data and may send signaling via the SIP flow for application 1.

The data flows may be processed by a data layer and mapped to IP flows. The data layer may include Transmission Control Protocol (TCP), User Datagram Protocol (UDP), IP and/or other protocols. For example, station 110 may have one IP flow to carry RTP and SIP flows for a VoIP application and may have another IP flow to carry a best effort flow for a browser application.

In IEEE 802.11e, the IP flows may be processed by the MAC layer and mapped to traffic streams. Each traffic stream may be associated with a traffic classification (TCLAS) and/or a traffic specification (TSPEC). The TCLAS specifies parameters used to identify MAC service data units (MSDUs) belonging to the traffic stream so that these MSDUs can be sent in accordance with the TSPEC for the traffic stream. The TSPEC describes traffic attributes (e.g., MSDU sizes and arrival rates) and traffic characteristics (e.g., data rate, maximum delivery delay, maximum delay variance or jitter, etc.) of the traffic stream. Some or all of the parameters for the TSPEC may be considered as QoS parameters that may be used to define QoS.

IEEE 802.11e supports enhanced distributed channel access (EDCA), which allows for prioritized access to the wireless medium/channel by stations based on QoS requirements of the flows carried by these stations and the amount of traffic through the stations. EDCA utilizes the following access parameters for controlling access and transmission on the channel by the stations.

Arbitration inter frame space (AIFS)—amount of time to wait for the channel to be idle before transmission may occur, Minimum and maximum contention windows (CWmin and CWmax)—amount of time to wait when the channel is detected to be busy, and Transmission opportunity (TXOP) limit—maximum amount of time a station can transmit on the channel upon gaining access.

To access the channel, station 110 may first sense the channel to see if the channel is idle or busy. If the channel is idle for AIFS time, then station 110 may transmit on the channel. If the channel is busy, then station 110 may wait until the channel becomes idle, then wait for the channel to remain idle for AIFS time, and then select a random backoff between zero and a contention window, which may be set to CWmin initially. The random backoff is used to avoid a scenario in which multiple stations transmit simultaneously after sensing the channel idle for AIFS. Station 110 may then count down the random backoff, pausing whenever the channel is busy, and restarting the countdown after the channel is idle for AIFS. Station 110 may transmit on the channel when the countdown reaches zero. Station 110 may double the contention window after each unsuccessful transmission until the contention window reaches CWmax.

AIFS is the amount of time that station 110 waits after the channel becomes idle following a busy period. Station 110 defers access to the channel during AIFS time. AIFS may thus affect the likelihood of gaining access to the channel. In general, a station with higher priority traffic may use a smaller AIFS value to allow for access of the channel before other stations with lower priority traffic and hence larger AIFS values. The minimum contention window and (to a lesser extent) the maximum contention window may determine the average amount of time to access the channel. A station with a smaller CWmin may, on average, gain access to the channel in a shorter amount of time than a station with a larger CWmin.

IEEE 802.11e supports four access categories—voice (AC_VO), video (AC_VI), best effort (AC_BE), and background (AC_BK). The four access categories have a total of eight different priorities, with each access category having two priorities. Background has priorities of 0 and 1, best effort has priorities of 2 and 3, video has priorities of 4 and 5, and voice has priorities of 6 and 7. For each access category, the lower priority is for data and the higher priority is for signaling. This allows signaling to be sent before data if there is contention between data and signaling.

An access point may set the values of AIFS, CWmin, CWmax, and TXOP limit for each access category. These parameter values may determine the likelihood of gaining access to the channel, the average duration for channel access, the average transmission time on the channel, etc. In general, smaller values for AIFS, CWmin and CWmax may improve channel access and may thus be used for data and signaling in higher priority access categories. The access point may transmit the access parameter values in beacon frames, probe response frames, association response frames, etc. All stations associated with the access point may use the access parameter values to access the channel.

Figure 3:
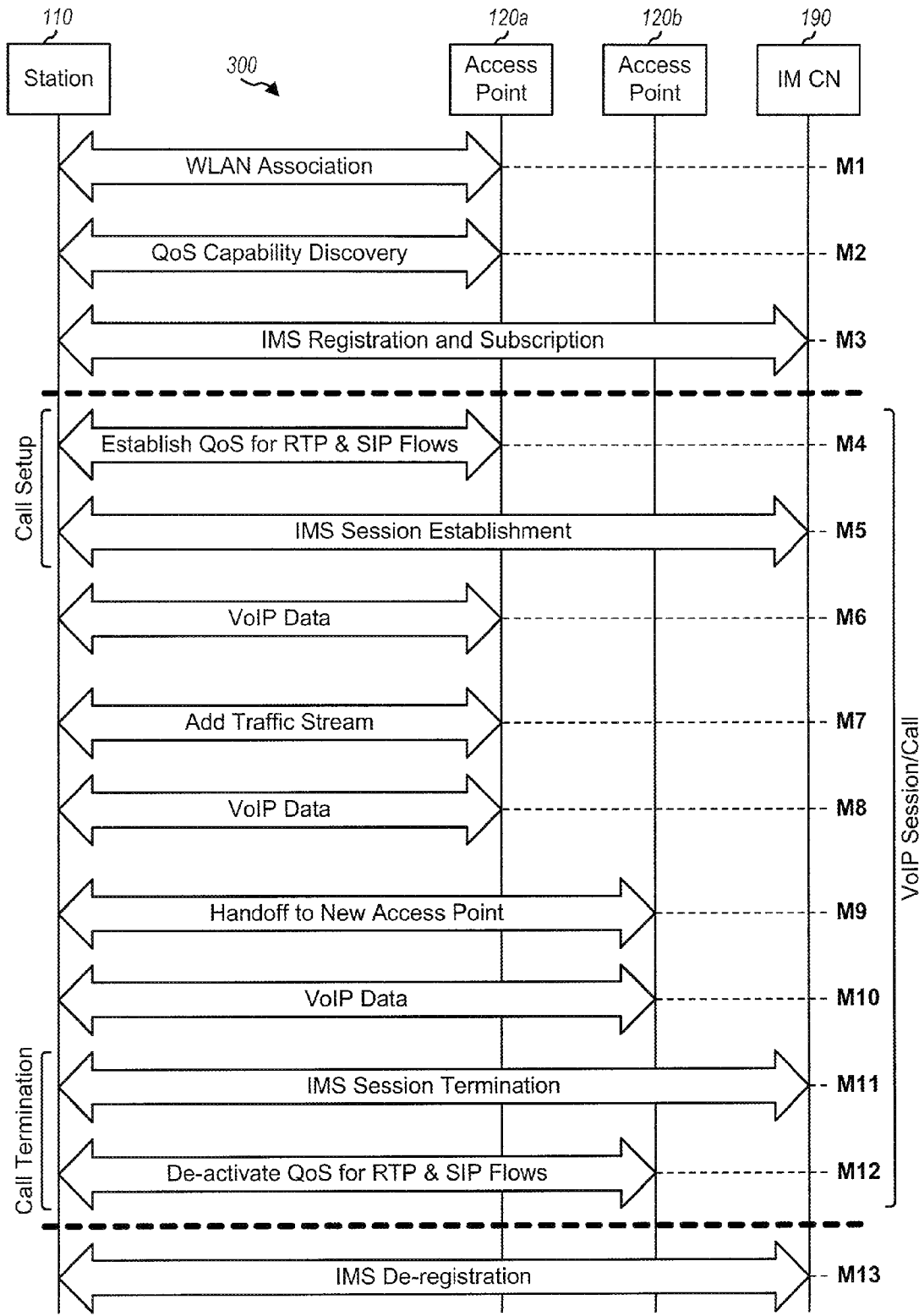
FIG. 3 shows a message flow for a VoIP call/session by a station.

FIG. 3 shows a message flow 300 for a VoIP call/session by station 110. FIG. 3 shows (i) data and signaling exchanges between station 110 and access points 120a and 120b and (ii) SIP signaling exchanges between station 110 and an IM core network (IM CN) 190. IM CN 190 may include CSCF 172 or 174 and possibly other network entities. For simplicity, data and signaling exchanges between access points 120a and 120b and other network entities such as PDG/WAG 162 and PDIF 164 are not shown in FIG. 3. Signaling exchanges among various network entities in IM CN 190 are also not shown.

Initially, station 110 may search for WLANs, detect access points in WLAN 100, and associate with access point 120a in WLAN 100 (step M1). Step M1 may include making RSSI measurements, reading beacon frames, exchanging probe request/response, performing access and user authentication, and exchanging association request/response with access point 120a. Station 110 may then discover the QoS capability of access point 120a, e.g., based on beacon frames transmitted periodically by access point 120a, a probe response sent by access point 120a for a probe request sent by station 110, etc. (step M2). Station 110a may then perform IMS registration with IM CN 190 (step M3). Steps M1 to M3 may be performed when station 110 is powered up, when station 110 moves into a new coverage area, etc.

A VoIP application may be launched at station 110. Station 110 may then establish a VoIP call with remote terminal 180, which may be coupled to PSTN 178 as shown in FIG. 1 or some other wireless or wireline network. Station 110 may establish QoS for RTP and SIP flows for the VoIP call with access point 120a (step M4). Station 110 may also performed IMS session establishment with IM CN 190 (step M5). Steps M4 and M5 are for call setup and may be performed concurrently or in different order depending on whether station 110 originated or received the VoIP call.

After completing call setup, station 110 may exchange VoIP data with access point 120a (step M6), which may route the VoIP data to remote terminal 180 (not shown in FIG. 3). A voice frame may be generated by a voice coder/decoder (vocoder) and sent in an RTP packet. RTP packets may be encapsulated in UDP datagrams and sent in IP packets. Station 110 may establish a traffic stream for the voice access category in step M4. At any time during the call, station 110 may add a new traffic stream or update an existing traffic stream, both of which are referred to as "adding" a traffic stream (step M7). Station 110 may exchange VoIP data with access point 120a for all traffic stream(s) (step M8).

Station 110 may perform handoff from access point 120a to access point 120b during the VoIP call (step M9). Step M9 may include sending a disassociation message to access point 120a, receiving an acknowledgement from access point 120a, sending an association request message to access point 120b, receiving an association response message from access point 120b, and establishing QoS with access point 120b. Station 110 may then exchange VoIP data with access point 120b based on the QoS granted by access point 120b (step M10). At some point, station 110 or remote terminal 180 may terminate the VoIP call. Station 110 may exchange SIP signaling with IM CN 190 for IMS session termination (step M11) and may de-activate QoS for the RTP and SIP flows (step M12). Steps M10 and M11 are for call termination and may be performed concurrently or in different order.

Steps M4 through M12 may be performed for another call. Station 110 may perform IMS de-registration, e.g., when a VoIP application is closed (step M13).

In FIG. 3, each step is represented by a double-headed arrow and typically involves a set of messages exchanged between at least two entities. Some of these steps may be performed in a manner such that improved performance may be achieved for a call, as described below.

In an aspect, station 110 ensures that an access point in a WLAN is "suitable" prior to performing registration to receive services via the WLAN or to move services over to the WLAN. The channel conditions between station 110 and the access point may fluctuate widely, and the received signal quality may likewise vary widely. The access point may be considered suitable if it is relatively stable and can be received with sufficient signal quality by station 110. Station 110 may delay service registration until station 110 determines that the access point is suitable. This delayed service registration may avoid a scenario in which station 110 performs service registration via an intermittent access point and receives poor quality service via this access point.

The suitability of an access point may be determined based on RSSI measurements, FER for beacon frames, etc. The access point may periodically transmit beacon frames, e.g., every 100 milliseconds (ms). In one design, station 110 may make RSSI measurements for the beacon frames received from the access point. Station 110 may compare the RSSI measurements against an RSSI threshold and declare the access point to be suitable if a predetermined percentage of the RSSI measurements is above the RSSI threshold. In another design, station 110 may decode each received beacon frame and determine whether the beacon frame is decoded correctly or in error. Station 110 may determine the FER for beacon frames received over a certain time interval, e.g., one to five seconds. Station 110 may compare the beacon FER against an FER threshold (e.g., 10%) and may declare the access point to be suitable if the beacon FER is below the FER threshold. In another design, station 110 may first make RSSI measurements for the access point. If some number of RSSI measurements exceed the RSSI threshold, then station 110 may next ascertain the beacon FER to determine whether the access point is suitable. Station 110 may also determine whether the access point is suitable based on other parameters.

Station 110 may perform service registration after identifying a suitable access point in the WLAN. Station 110 may register in IMS to receive all services via the WLAN. Alternatively, station 110 may register in IMS to receive only certain services via the WLAN, e.g., depending on the performance of the WLAN and the QoS requirements of the services. For example, station 110 may register to receive best effort services via the WLAN if the beacon FER is below a first FER threshold. Station 110 may register to receive VoIP service via the WLAN if the beacon FER is below a second FER threshold that is lower than the first FER threshold. Correspondingly, Station 110 may de-register for the best effort service if the beacon FER exceeds a third FER threshold that is higher than the first FER threshold. Station 110 may de-register for the VoIP service if the beacon FER exceeds a fourth FER threshold that is higher than the second FER threshold. For each service, the FER threshold for registration may be lower than the FER threshold for de-registration in order to provide hysteresis and avoid ping-pong in the WLAN selected for the service. The beacon FER may be filtered to obtain more reliable FER measurements. Station 110 may thus separate radio acquisition for the WLAN and IMS registration to receive services via the WLAN.

Station 110 may also change service registration based on the performance of the WLAN. For example, station 110 may initially register in IMS to receive all services via the WLAN. If the WLAN performance degrades, then station 110 may de-register with IMS for VoIP service but may continue to receive best effort service via the WLAN. The WLAN performance may be quantified by RSSI measurements, beacon FER, data PER, etc.

Figure 4:
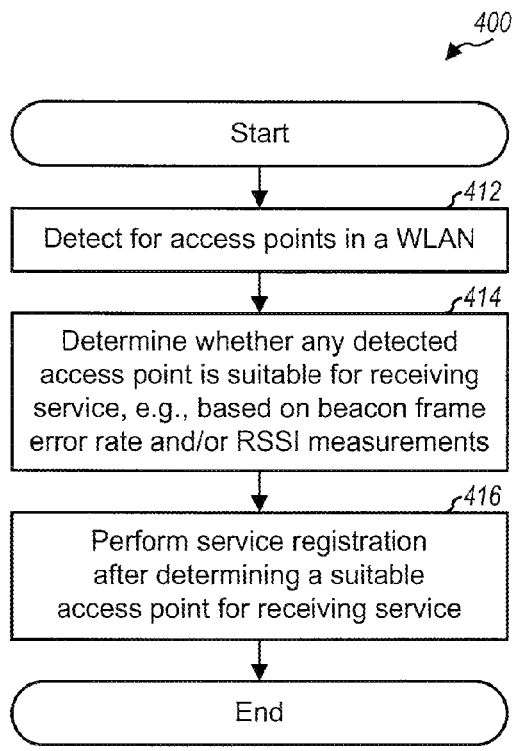
FIG. 4 shows a process performed by the station for service registration.

FIG. 4 shows a design of a process 400 performed by station 110 for service registration. Station 110 may detect for access points in a WLAN (block 412). Station 110 may determine whether any detected access point is suitable for receiving service (block 414). Station 110 may determine that an access point is suitable for receiving service if (i) a FER for beacon frames received from the access point is below an FER threshold and/or (ii) a particular percentage of RSSI measurements for the access point is above an RSSI threshold. Station 110 may determine that an access point is suitable for receiving service based on measurements obtained for the access point for a sufficiently long time period (e.g., more than one second) to ensure that the access point is stable.

Station 110 may perform service registration after determining a suitable access point for receiving service (block 416). The service registration is typically with a designated network entity in an appropriate network, which may be a home network, a visited network, or some other network. For example, station 110 may register with a P-CSCF for IMS, with a home agent for mobile IP, etc. Station 110 may also register for different services depending on performance. For example, station 110 may register for best effort service if the FER for the suitable access point is below a first FER threshold and register for VoIP service if the FER is below a second FER threshold that is lower than the first FER threshold.

In another aspect, station 110 may first request for radio resources for traffic flows and then request for radio resources for signaling flows. For a VoIP call, station 110 may first request radio resources for an RTP flow and may then request radio resources for a SIP flow. The traffic flows may have QoS requirements for satisfactory performance. Radio resources may be requested to ensure that the required QoS can be achieved for these traffic flows. The signaling flows may be able to tolerate delay and may be sent as best effort traffic if no radio resources are granted for these flows. This manner of requesting for radio resources for traffic and signaling flows may allow the call to proceed when radio resources are granted for the traffic flows but not for the signaling flows.

Radio resources may also be referred to as air-link resources, QoS resources, resources, etc. Radio resources may be quantified in different manners for different wireless networks. Radio resources may also be granted in different manners for different wireless networks and different operating modes of a given wireless network. For WLAN, radio resources may be quantified by time (and also by transmit power to a lesser extent). IEEE 802.11e supports a scheduled Automatic Power Save Delivery (S-APSD) mode and an unscheduled APSD (U-APSD) mode. In the S-APSD mode, an access point schedules service times for stations associated with that access point. The access point may grant radio resources based on the duration and periodicity of the services times scheduled by the access point. In the U-APSD mode, each station may independently choose its service times, and the access point buffers data for the station. Regardless of the mode of operation, the access point may grant radio resources to each station in order to meet the QoS requirements of that station.

The access point may have knowledge of the traffic streams and QoS requirements of all stations associated with that access point. The access point may be able to grant or deny requests for radio resources from the stations based on the radio resources available to the access point and the radio resources allocated to the stations. Radio resources are related to QoS, and the two terms are often used interchangeably.

Figure 5:
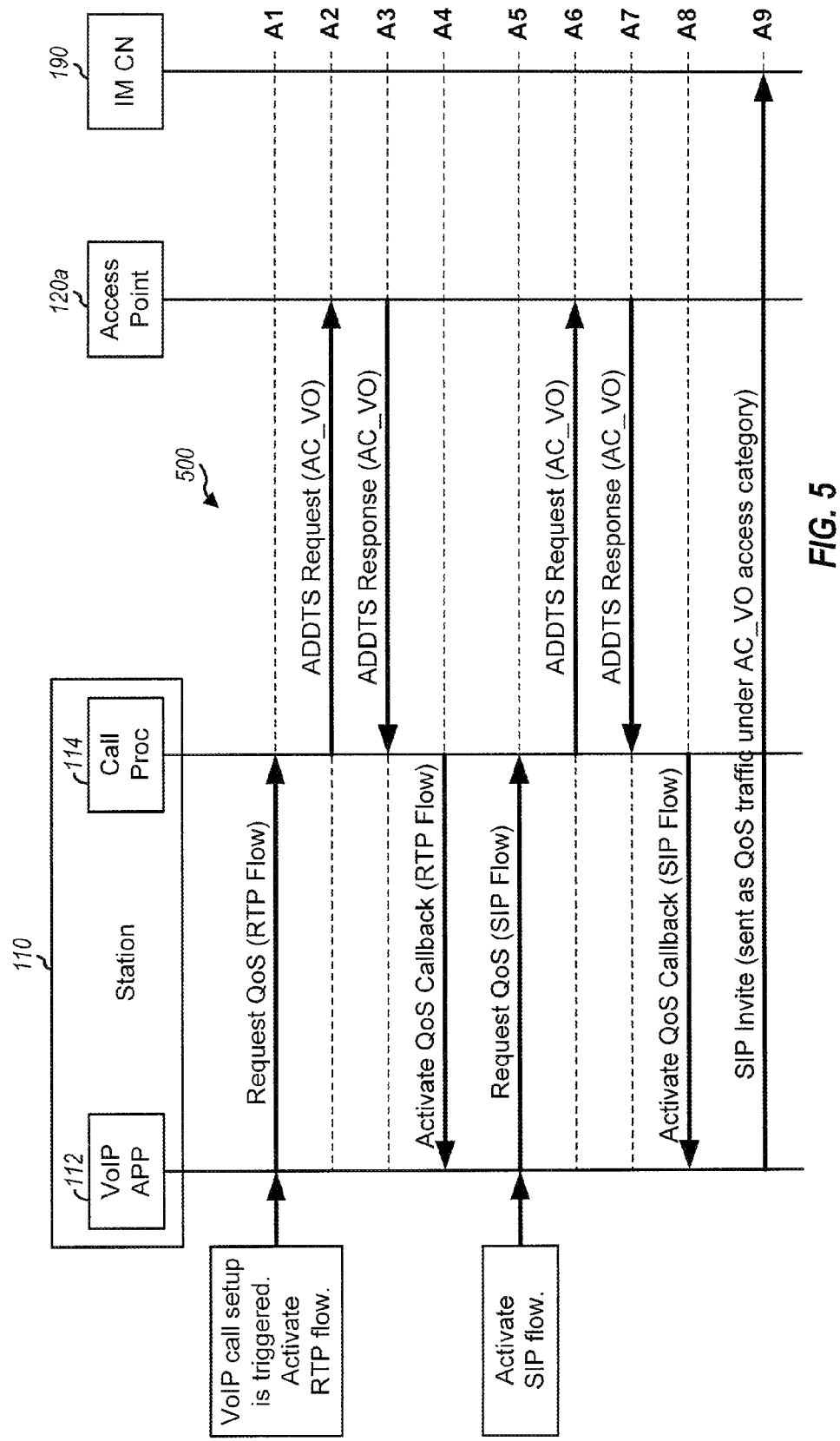
FIG. 5 shows a message flow for mobile-originated call setup.

FIG. 5 shows a message flow 500 for mobile-originated call setup. Message flow 500 may be used for steps M4 and M5 in FIG. 3. Initially, VoIP call setup for a VoIP call may be triggered, e.g., in response to a user dialing a number at station 110 (step A1). An RTP flow for the VoIP call may be activated, and a VoIP application (APP) 112 at station 110 may send a request for QoS for the RTP flow to a call processing (Proc) module 114 within station 110 (also step A1). Station 110 may then send to access point 120a an ADDTS (Add Traffic Stream) Request message that includes the requested QoS for the RTP flow (step A2). The RTP flow may belong in the voice access category (AC_VO). The ADDTS Request message may request addition of a traffic stream for the voice access category and may include a TSPEC for this access category. The TSPEC may contain parameters describing the requested QoS for the RTP flow. Access point 120a may grant radio resources for the requested QoS and may return an ADDTS Response message that indicates the grant of radio resources (step A3). Module 114 may receive the ADDTS Response message and send a QoS activated notification for the RTP flow to VoIP application 112 (step A4).

A SIP flow for the VoIP call may then be activated, and VoIP application 112 may send a request for QoS for the SIP flow to module 114 (step A5). The RTP and SIP flows may be for the same voice access category. Module 114 may then aggregate the required QoS for the SIP flow with the required QoS for the RTP flow to obtain the aggregated QoS for the voice access category. Station 110 may then send to access point 120a an ADDTS Request message that includes parameters describing the aggregated QoS for both the RTP and SIP flows (step A6). Access point 120a may grant radio resources for the aggregated QoS for both flows and may return an ADDTS Response message that indicates the grant of radio resources (step A7). Module 114 may receive the ADDTS Response message and send a QoS activated notification for the SIP flow to VoIP application 112 (step A8). Station 110 may then send SIP signaling (e.g., a SIP Invite message) as QoS traffic for the voice access category (step A9).

If access point 110a does not have sufficient radio resources for the aggregated QoS for both the RTP and SIP flows, then in step A7 access point 110a may return an ADDTS Response message with an indication of rejection of the aggregated QoS request. Module 114 may then provide a failure notification to VoIP application 112 in step A8. Station 110 may then send SIP signaling as best effort traffic starting in step A9 and may proceed with call setup.

If access point 110a does not have sufficient radio resources for the RTP flow, then in step A3 access point 110a may return an ADDTS Response message with an indication of rejection of the QoS request. Module 114 may then provide a failure notification to VoIP application 112 in step A4. If QoS for the RTP flow is preferred but not required, then station 110 may proceed with the VoIP call and may send RTP data and SIP signaling as best effort traffic. If QoS for the RTP flow is required, then the VoIP call would fail with access point 120a, and station 110 may attempt the call on another wireless network, e.g., 3GPP network 102 or 3GPP2 network 104 in FIG. 1.

Figure 6:
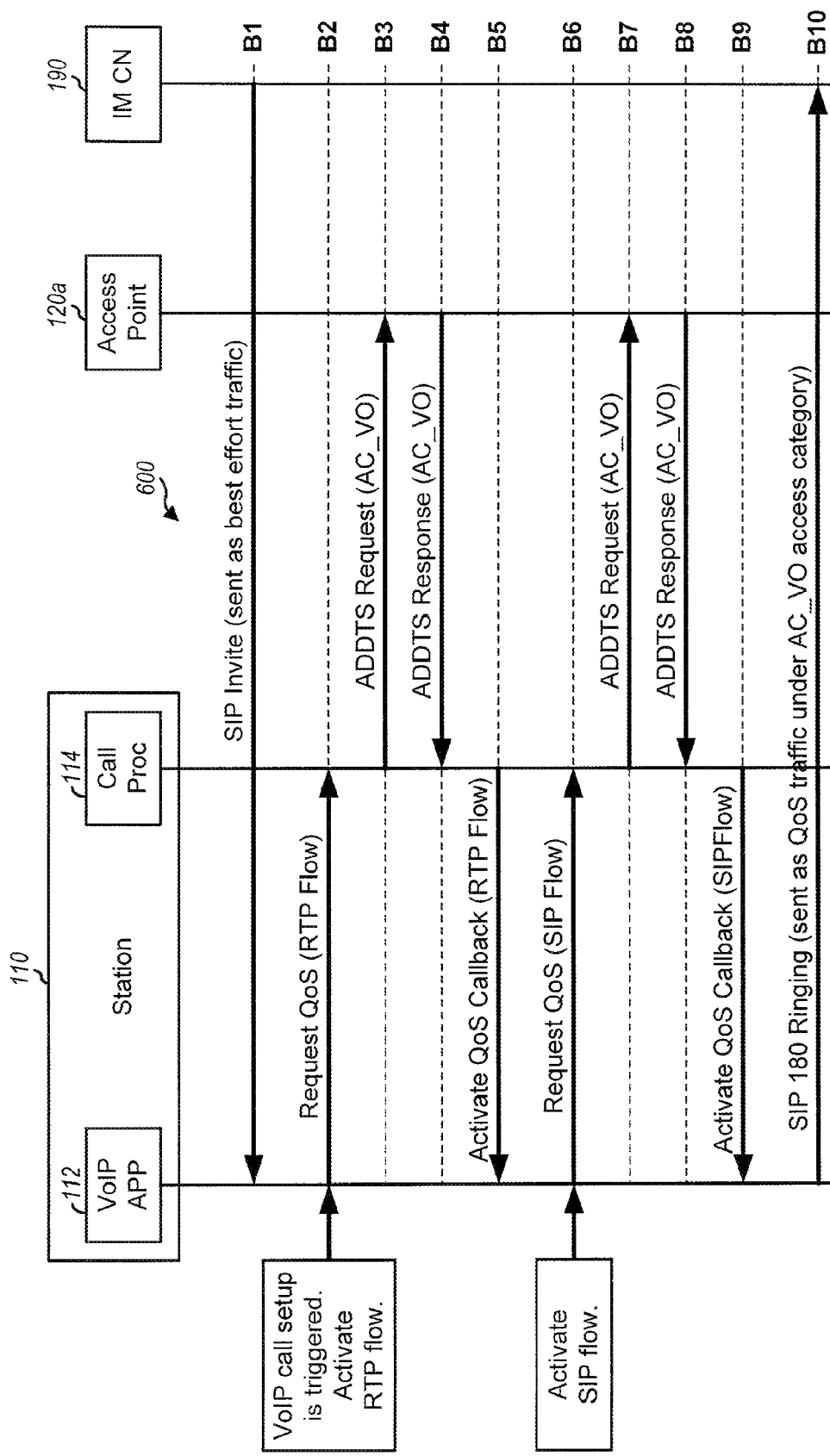
FIG. 6 shows a message flow for mobile-terminated call setup.

FIG. 6 shows a message flow 600 for mobile-terminated call setup. Message flow 600 may also be used for steps M4 and M5 in FIG. 3. Initially, station 110 may receive a SIP Invite message from remote terminal 180 for an incoming call (step B1). VoIP call setup may be triggered by the SIP Invite message (step B2). Steps B2 through B9 may then be performed in similar manner as steps A1 through A8, respectively, in FIG. 5. Station 110 may then send a SIP 1xx Response message (e.g., a SIP 180 Ringing message) using the granted radio resources for the voice access category if the QoS request for the SIP flow is granted by access point 120a in step B8. Alternatively, the SIP message may be sent as best effort traffic if the QoS request for the SIP flow is not granted.

Station 110 may send RTP data and SIP signaling for the VoIP call. The data and signaling may be exchanged with the WLAN and may achieve the desired QoS with the radio resources granted by the WLAN. The data and signaling may be forwarded to nodes outsides of the WLAN to remote terminal 180. Station 110 may use differentiated service marking to achieve good performance for the data and signaling for the VoIP call. In IP version 4 (IPv4), each IP packet includes a header having an 8-bit Type of Service (TOS) field. The TOS field is divided into a 6-bit Differentiated Services Codepoint (DSCP) field and a 2-bit currently unused (CU) field. Various values are defined for the DSCP field for different services. Packets may be classified and marked as belonging in a particular service. These packets may then receive designated per-hop forwarding behavior on nodes along their paths. Packets for VoIP may be marked with an octal value of 56 to receive expedited forwarding by nodes that support differentiated services.

Figure 7:
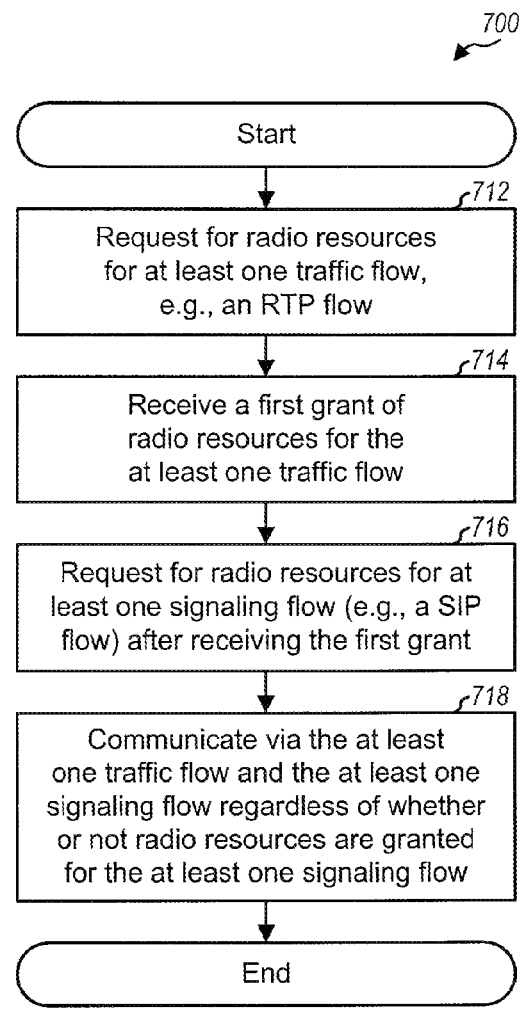
FIG. 7 shows a process for requesting radio resources.

FIG. 7 shows a design of a process 800 performed by station 110 to request radio resources. Station 110 may request for radio resources for at least one traffic flow, e.g., an RTP flow (block 712). Station 110 may receive a first grant of radio resources for the at least one traffic flow (block 714). Station 110 may then request for radio resources for at least one signaling flow, e.g., a SIP flow, after receiving the first grant (block 716). Station 110 may communicate via the at least one traffic flow and the at least one signaling flow regardless of whether or not radio resources are granted for the at least one signaling flow (block 718).

Station 110 may send data for the at least one traffic flow with the first grant of radio resources. If station 110 receives a second grant of radio resources for the at least one signaling flow, then station 110 may send signaling for the at least one signaling flow with the second grant of radio resources. If station 110 receives no grant of radio resources for the at least one signaling flow, then station 110 may send signaling for the at least one signaling flow as best effort traffic. Station 110 may send data for the at least one traffic flow and signaling for the at least one signaling flow with expedited forwarding based on DSCP marking for packets carrying the data and signaling.

The traffic and signaling flows may be for the same access category, e.g., voice. Station 110 may send data for the at least one traffic flow based on the AIFS, CWmin, CWmax, and TXOP limit values for this access category. Station 110 may send signaling for the at least one signaling flow based on the AIFS, CWmin, CWmax, and TXOP limit values for this access category (if radio resources are granted) or based on the AIFS, CWmin, CWmax, and TXOP limit values for the best effort access category (if radio resources are not granted).

In yet another aspect, station 110 may aggregate QoS requirements and request QoS for each access category. Station 110 may have any number of active applications, which may have any number of flows for any set of access categories. Station 110 may aggregate the QoS requirements for all applications for each access category. In one design, the QoS for traffic flows (but not signaling flows) for each access category is aggregated. In another design, the QoS for traffic flows for each access category is aggregated, and the QoS for signaling flows for each access category is aggregated separately. In yet another design, the QoS for both traffic and signaling flows for each access category is aggregated. In any case, station 110 may request for radio resources for the aggregated QoS for each access category.

The QoS for a given application may be quantified by parameters such as delay bound, throughput, PER, and jitter. Multiple applications may be for the same access category (e.g., voice) and may have the same or different values for these QoS parameters. For example, N applications 1 to N for a given access category may have delay bound requirements of $D_1$ to $D_N$, respectively, throughput requirements of $T_1$ to $T_N$, PER requirements of $PER_1$ to $PER_N$, and jitter requirements of $J_1$ to $J_N$. The QoS for these N applications may be aggregated by taking the smallest of the N delay bound requirements, the sum of the N throughput requirements, the smallest of the N PER requirements, and the smallest of the N jitter requirements for these N applications. The aggregated QoS may then be requested for these N applications.

For a given access category, a new application may be added to that access category at any time, and an existing application may be removed from the access category at any time. Whenever an application is added to or removed from the access category, the aggregated QoS for the access category may be updated based on the QoS of the added or removed application. Station 110 may then request for radio resources for the updated aggregated QoS from the WLAN by sending an ADDTS Request message with a new TSPEC for the updated aggregated QoS. The WLAN may grant the request and return an ADDTS Response message. The WLAN may also deny the request, in which case the new TSPEC is not supported by the WLAN but the prior TSPEC is still applicable. After the last application for the access category is closed, station 110 may delete the traffic stream for this access category by sending a DELTS (Delete Traffic Stream) Request message.

The aggregation of QoS for all applications in each access category may be performed at the start of a call prior to QoS establishment in step M4 in FIG. 3. The aggregated QoS may then be requested from the WLAN in step M4. The aggregated QoS may also be updated during the call whenever a new application is added or an existing application is closed. The updated aggregated QoS may then be requested from the WLAN, e.g., in step M7 in FIG. 3.

FIG. 8 shows a design of a process 800 performed by station 110 to aggregate QoS for multiple applications. Station 110 may determine QoS for each of multiple applications (block 812) and may aggregate the QoS for the multiple applications (block 814). Station 110 may request for radio resources from a WLAN based on the aggregated QoS for the multiple applications (block 816).

Thereafter, station 110 may determine QoS for an additional application (block 818) and may update the aggregated QoS with the QoS for the additional application (block 820). Station 110 may then request for radio resources based on the updated aggregated QoS (block 822). Station 110 may determine QoS for one of the multiple applications being closed (block 824) and may update the aggregated QoS with the QoS for the application being closed (block 826). Station 110 may then request for radio resources based on the updated aggregated QoS (block 828). The multiple applications may be for the same access category. Station 110 may send data and/or signaling for these applications based on the AIFS, CWmin, CWmax, and TXOP limit values for this access category.

Station 110 may establish a traffic stream for the multiple applications with the WLAN. Station 110 may update the aggregated QoS for the multiple applications whenever an additional application is added or an existing application is closed. Station 110 may then send an ADDTS Request message with updated parameter values (e.g., an updated TSPEC) determined based on the updated aggregated QoS. Station 110 may also send a DELTS Request message when the last of the multiple applications is closed.

In yet another aspect, station 110 may relinquish extra radio resources if the QoS granted to station 110 for a call is greater than the QoS supported by remote terminal 180 for the call. Station 110 may be granted certain QoS by the WLAN in step M4. Station 110 may perform end-to-end QoS negotiation with terminal 180 in step M5 to determine the QoS for the call. If the QoS negotiated with terminal 180 is lower than the QoS granted by the WLAN, then station 110 may relinquish extra radio resources corresponding to the difference between the QoS granted by the WLAN and the QoS negotiated with terminal 180.

For a mobile-originated VoIP call, e.g., as shown in FIG. 5, station 110 may send a SIP Invite message to terminal 180 during the IMS session establishment. This SIP Invite message may include one or more media formats supported by station 110, which may be given in an order of preference by station 110. Each media format may be associated with a set of parameters to use for communication and may also be associated with a particular QoS. For VoIP, each media format may correspond to a set of vocoders and a particular QoS level or profile. The media format(s) supported by station 110 may be determined based on the QoS granted to station 110 by the WLAN. For example, QoS levels A through Z may be available, with QoS level A being the highest and QoS level Z being the lowest. Station 110 may request for QoS level B from the WLAN, and the WLAN may grant QoS level D to station 110. The media format(s) included in the SIP Invite message may then be associated with QoS level D or lower.

Remote terminal 180 may also request for radio resources, e.g., upon receiving the SIP Invite message from station 110. Terminal 180 may then return a SIP 180 Ringing message that may include one or more media formats supported by terminal 180, which may be given in an order of preference by terminal 180. The media format(s) supported by terminal 180 may be determined based on the QoS granted to terminal 180. For example, the most preferred media format from station 110 may require QoS level D, terminal 180 may then request for QoS level D but may be granted QoS level E. The media format(s) included in the SIP 180 Ringing message may then be associated with QoS level E or lower.

Station 110 may communicate with terminal 180 based on the most preferred media format supported by both entities. If this selected media format requires certain QoS that is lower than the QoS granted to station 110 by the WLAN, then station 110 may release the extra radio resources corresponding to the difference between the QoS granted to station 110 and the QoS for the selected media format. Station 110 may communicate with terminal 180 using the selected media format.

For a mobile-terminated VoIP call, e.g., as shown in FIG. 6, station 110 may receive a SIP Invite message from terminal 180 during the IMS session establishment. This SIP Invite message may contain one or more media formats supported by terminal 180. Station 110 may request for QoS from the WLAN and may be granted certain QoS by the WLAN. The granted QoS may be higher than the highest QoS for the media format(s) proposed by terminal 180. If station 110 proposes a media format with QoS higher than the highest QoS from terminal 180, then there is high likelihood of this media format being rejected by terminal 180. Station 110 may thus restrict the media format(s) proposed to terminal 180 to those with QoS equal to or lower than the highest QoS from terminal 180. For example, the media format(s) proposed by terminal 180 may be associated with QoS level E or lower. Station 110 may be granted QoS level B by the WLAN but may propose media format(s) with QoS level E or lower. The media format selected for use by station 110 and terminal 180 may have QoS level E or lower. Station 110 may then relinquish the extra radio resources corresponding to the difference between the QoS granted by the WLAN and the QoS negotiated with terminal 180.

FIG. 9 shows a design of a process 900 performed by station 110 to relinquish extra radio resources. Station 110 may determine QoS granted by a WLAN (block 912) and may determine QoS for a media format proposed by a remote terminal for a call (block 914). Station 110 may release extra radio resources corresponding to the difference between the QoS granted by the WLAN and the QoS for the media format proposed by the remote terminal (block 916).

For a mobile-originated call, station 110 may determine at least one media format based on the QoS granted by the WLAN, with each media format being associated with QoS equal to or lower than the QoS granted by the WLAN. Station 110 may then send the at least one media format as proposal to the remote terminal. The media format proposed by the remote terminal may be one of the media format(s) sent by station 110.

For a mobile-terminated call, station 110 may select a media format based on the QoS for the media format proposed by the remote terminal. The media format selected by station 110 may be associated with QoS equal to or lower than the QoS for the media format proposed by the remote terminal. Station 110 may then send the selected media format to the remote terminal. Station 110 may release extra radio resources corresponding to the difference between the QoS granted by the WLAN and the QoS for the media format sent to the remote terminal.

As shown in FIG. 3, station 110 may be handed off from current access point 120a to new access point 120b during the VoIP call. Station 110 may communicate with remote terminal 180 based on a particular QoS granted by access point 120a. Station 110 may request the same or higher QoS from new access point 120b, which may be able to grant higher QoS than current access point 120a. Station 110 may receive a grant of higher QoS from new access point 120b and may propose the higher QoS to remote terminal 180. In this case, terminal 180 may need to re-negotiate QoS with its network for the higher QoS, which may then interrupt the current call.

In yet another aspect, when handed off from current access point 120a to new access point 120b, station 110 may request for QoS from the new access point based on the QoS granted by the current access point. The QoS granted by current access point 120a may or may not be the QoS originally requested by station 110. For example, station 110 may originally request for QoS level A from current access point 120a but may be granted QoS level D. Station 110 may communicate with remote terminal 180 based on QoS level D granted by current access point 120a. When handed off to new access point 120b, station 110 may request QoS level D (instead of QoS level A) from the new access point. The likelihood of being granted QoS level D may be greater than the likelihood of being granted QoS level A. If station 110 is granted QoS level D, then station 110 may continue to communicate with remote terminal 180 using QoS level D, without the need for QoS re-negotiation by remote terminal 180. If station 110 is granted a QoS level lower than QoS level D, then station 110 may continue to communicate with remote terminal 180 using the lower QoS level. Remote terminal 180 may relinquish the extra radio resources corresponding to the difference between QoS level D and the lower QoS level.

Figures 10, 11:
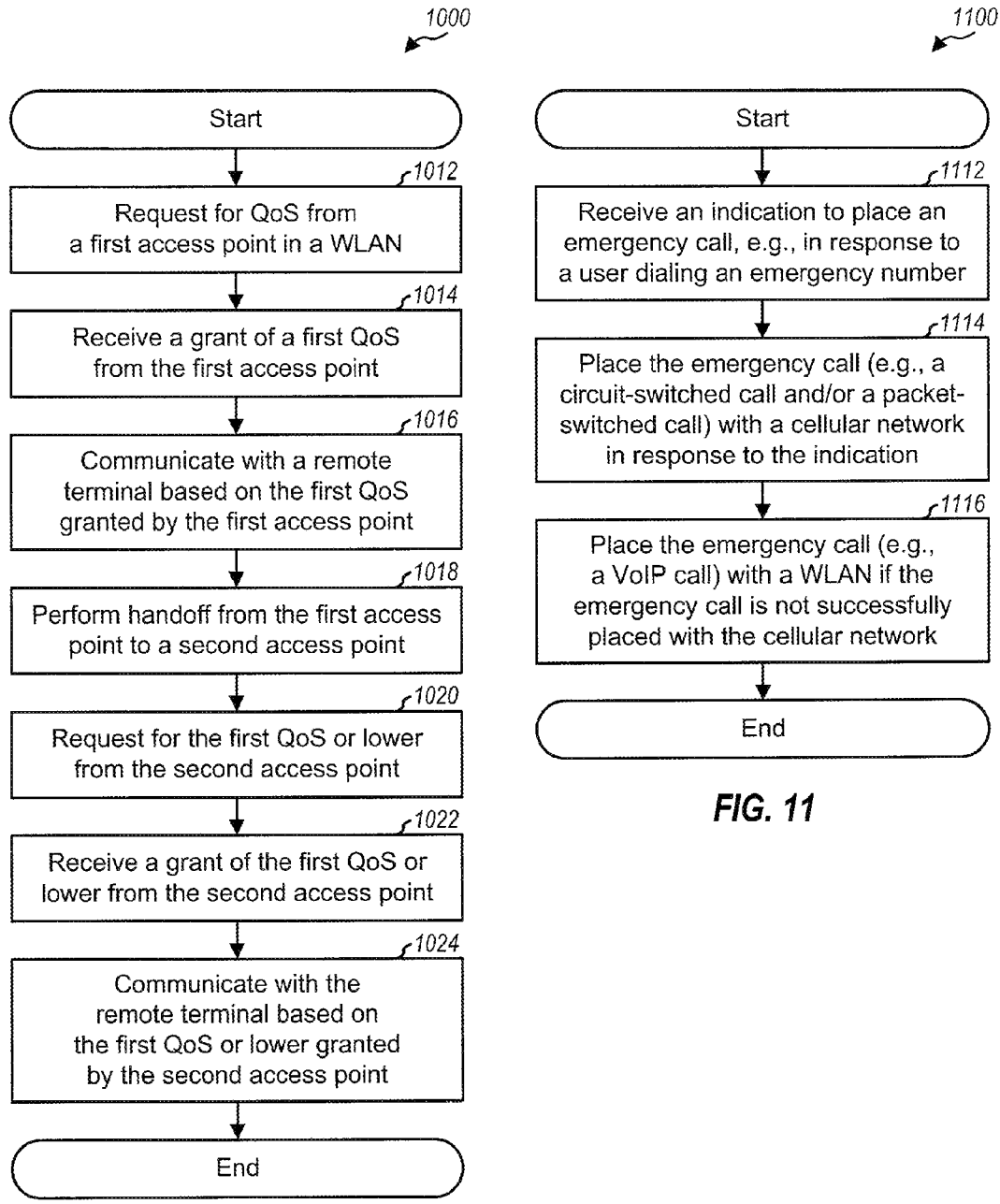
FIG. 10 shows a process for establishing QoS during handoff.
FIG. 11 shows a process for placing an emergency call.

FIG. 10 shows a design of a process 1000 performed by station 110 to establish QoS with a new access point during handoff. Station 110 may request for QoS from a first access point in a WLAN (block 1012) and may receive a grant of a first QoS from the first access point (block 1014). The first QoS may be equal to or lower than the QoS requested from the first access point. Station 110 may communicate with a remote terminal based on the first QoS granted by the first access point (block 1016). Station 110 may perform handoff from the first access point to a second access point (block 1018). Station 110 may request for the first QoS or lower from the second access point (block 1020) and may receive a grant of the first QoS or lower from the second access point (block 1022). Station 110 may then communicate with the remote terminal based on the first QoS or lower granted by the second access point (block 1024).

Data performance for station 110 may degrade during a call, e.g., due to congestion in the WLAN. Station 110 may then operate with lower QoS (e.g., use lower data rate for the vocoder) and may request for the lower QoS from the access point. This may alleviate congestion in the WLAN.

In yet another aspect, station 110 may first attempt to place an emergency call with a cellular network when a user dials an emergency number such as 911 in the United States or 112 in Europe. Station 110 may attempt to establish a circuit-switched call and/or a packet-switched call for the emergency call, depending on the capability of the cellular network and station 110. If the emergency call fails on the cellular network, then station 110 may attempt to place the emergency call with a WLAN.

It may be desirable to have the emergency call with the cellular network, if available, since the cellular network may have positioning capabilities and may be able to determine the location of station 110. However, if the cellular network is not available, then it may be desirable to have the emergency call with the WLAN.

After terminating the emergency call, whether placed in the cellular network or the WLAN, station 110 may remain in a callback state for a predetermined time period. During this period, station 110 may monitor the cellular network on which the emergency call was originally placed or any network that is available for emergency call. This callback mode allows a public agency (e.g., law enforcement) to reach station 110 to locate the user and/or for other tasks.

FIG. 11 shows a design of a process 1100 performed by station 110 to place an emergency call. Station 110 may receive an indication to place an emergency call, e.g., in response to a user dialing an emergency number (block 1112). Station 110 may place the emergency call (e.g., a circuit-switched call and/or a packet-switched call) with a cellular network in response to the indication (block 1114). Station 110 may place the emergency call (e.g., a VoIP call) with a WLAN if the emergency call is not successfully placed with the cellular network (block 1116).

Figure 12:
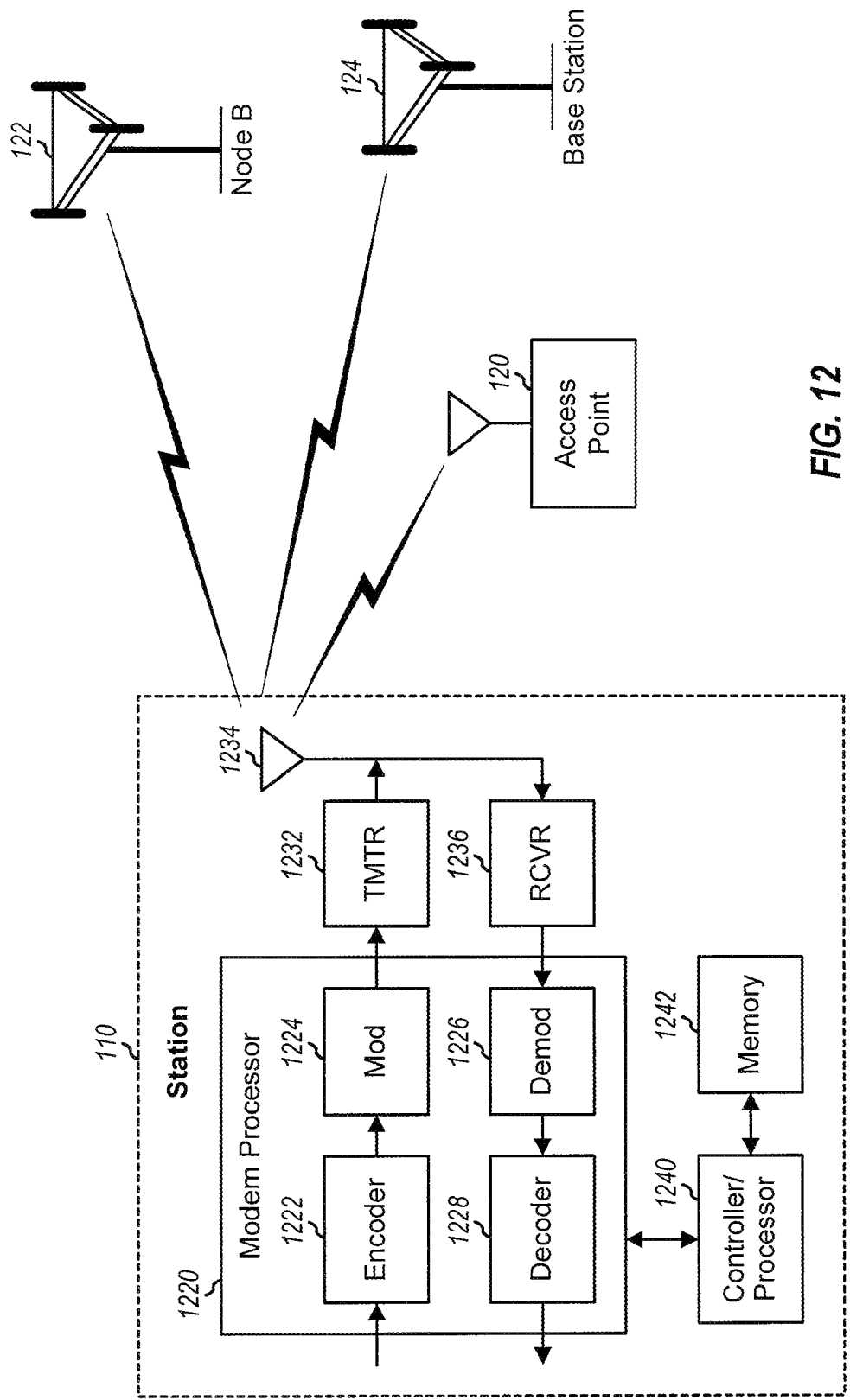
FIG. 12 shows a block diagram of the station.

FIG. 12 shows a block diagram of a design of station 110, which may be capable of communicating with access points in WLANs and base stations in WWANs, e.g., cellular networks. On the transmit path, data and signaling to be sent by station 110 is processed (e.g., formatted, encoded, and interleaved) by an encoder 1222 and further processed (e.g., modulated and scrambled) by a modulator (Mod) 1224 to generate output chips. The processing by encoder 1222 and modulator 1224 is dependent on the radio technology (e.g., 802.11, cdma2000, GSM, W-CDMA, etc.) for the wireless network to which data and signaling are sent. A transmitter (TMTR) 1232 conditions (e.g., converts to analog, filters, amplifies, and frequency upconverts) the output chips and generates a radio frequency (RF) output signal, which is transmitted via an antenna 1234.

On the receive path, RF signals transmitted by access points in WLANs and/or base stations in WWANs are received by antenna 1234 and provided to a receiver (RCVR) 1236. Receiver 1236 conditions (e.g., filters, amplifies, frequency downconverts, and digitizes) the received RF signal and provides samples. A demodulator (Demod) 1226 processes (e.g., descrambles and demodulates) the samples to obtain symbol estimates. A decoder 1228 processes (e.g., deinterleaves and decodes) the symbol estimates to obtain decoded data and signaling. The processing by demodulator 1226 and decoder 1228 is complementary to the processing by the modulator and encoder at the access point or base station being received. Encoder 1222, modulator 1224, demodulator 1226 and decoder 1228 may be implemented by a modem processor 1220.

A controller/processor 1240 directs the operation of various processing units at station 110. Memory 1242 stores program codes and data for station 110. Controller/processor 1240 may implement or direct processes 400, 700, 800, 900, 1000 and/or 1100 in FIGS. 4, 7, 8, 9, 10 and 11, respectively, message flows 300, 500 and/or 600 in FIGS. 3, 5 and 6, respectively, and/or other processes and message flows to support communication for station 110. Memory 1242 may store information for QoS for different flows and applications, access parameter values for each access category, and/or other information.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 1242 in FIG. 12) and executed by a processor (e.g., processor 1240). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
at least one processor configured:
to select a media format based on a first quality of service (QoS) that is granted to the apparatus by a first access point in a wireless local area network, the first QoS being lower than an initial QoS requested by the apparatus from the first access point;
to communicate the selected media format with a remote terminal based on the first QoS;
to perform handoff from the first access point to a second access point in the wireless local area network;
to request for a QoS from the second access point that is limited to the first QoS or lower irrespective of whether a higher level of QoS for supporting the media format is available for allocation by the second access point to the apparatus, wherein the QoS requested from the second access point is further lower than, or equal to, a QoS granted to the remote terminal;
to receive a grant of the first QoS or lower from the second access point; and
to communicate with the remote terminal based on the first QoS or lower granted by the second access point to avoid causing the remote terminal to re-negotiate the QoS granted to the remote terminal; and
a memory coupled to the at least one processor.

2. The apparatus of claim 1, wherein the at least one processor is configured to receive the grant of the first QoS from the first access point.

3. A method of operating an apparatus, comprising:
selecting a media format based on a first quality of service (QoS) that is granted to the apparatus by a first access point in a wireless local area network, the first QoS being lower than an initial QoS requested by the apparatus from the first access point;
communicating the selected media format with a remote terminal based on the first QoS;
performing handoff from the first access point to a second access point in the wireless local area network;

requesting for a QoS from the second access point that is limited to the first QoS or lower irrespective of whether a higher level of QoS for supporting the media format is available for allocation by the second access point to the apparatus, wherein the QoS requested from the second access point is further lower than, or equal to, a QoS granted to the remote terminal;

receiving a grant of the first QoS or lower from the second access point; and communicating with the remote terminal based on the first QoS or lower granted by the second access point to avoid causing the remote terminal to re-negotiate the QoS granted to the remote terminal.

4. The method of claim 3, further comprising:

receiving the grant of the first QoS from the first access point.

5. An apparatus, comprising:

means for selecting a media format based on a first quality of service (QoS) that is granted to the apparatus by a first access point in a wireless local area network, the first QoS being lower than an initial QoS requested by the apparatus from the first access point;

means for communicating the selected media format with a remote terminal based on the first QoS;

means for performing handoff from the first access point to a second access point in the wireless local area network;

means for requesting for a QoS from the second access point that is limited to the first QoS or lower irrespective of whether a higher level of QoS for supporting the media format is available for allocation by the second access point to the apparatus, wherein the QoS requested from the second access point is further lower than, or equal to, a QoS granted to the remote terminal;

means for receiving a grant of the first QoS or lower from the second access point; and means for communicating with the remote terminal based on the first QoS or lower granted by the second access point to avoid causing the remote terminal to re-negotiate the QoS granted to the remote terminal.

6. The apparatus of claim 5, further comprising:

means for receiving the grant of the first QoS from the first access point.

7. A non-transitory computer-readable medium comprising machine-executable code configured to cause an apparatus to perform operations for wireless communication, the non-transitory computer-readable medium comprising:

code for selecting a media format based on a first quality of service (QoS) that is granted to the apparatus by a first access point in a wireless local area network, the first QoS being lower than an initial QoS requested by the apparatus from the first access point;

code for communicating the selected media format with a remote terminal based on the first QoS;

code for performing handoff from the first access point to a second access point in the wireless local area network;

code for requesting for a QoS from the second access point that is limited to the first QoS or lower irrespective of whether a higher level of QoS for supporting the media format is available for allocation by the second access point to the apparatus, wherein the QoS requested from the second access point is further lower than or equal to a QoS granted to the remote terminal;

code for receiving a grant of the first QoS or lower from the second access point; and code for communicating with the remote terminal based on the first QoS or lower granted by the second access point to avoid causing the remote terminal to re-negotiate the QoS granted to the remote terminal.

8. The non-transitory computer-readable medium of claim 7, further comprising:

code for receiving the grant of the first QoS from the first access point.

9. The apparatus of claim 1, wherein the QoS requested from the second access point is lower than the first QoS.

10. The method of claim 3, wherein the QoS requested from the second access point is lower than the first QoS.

11. The apparatus of claim 5, wherein the QoS requested from the second access point is lower than the first QoS.

12. The non-transitory computer-readable medium of claim 7, wherein the QoS requested from the second access point is lower than the first QoS.

* * * * *